Dec. 29, 1959  W. SPRICK  2,919,364
PHOTOCELL WITH TRANSPARENT PHOTOCATHODE
Filed Oct. 4, 1955  2 Sheets-Sheet 1
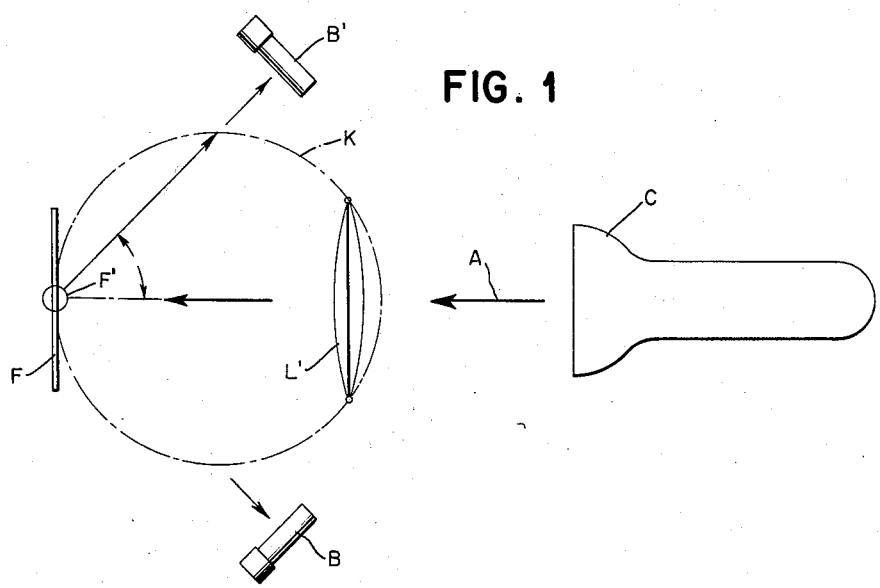
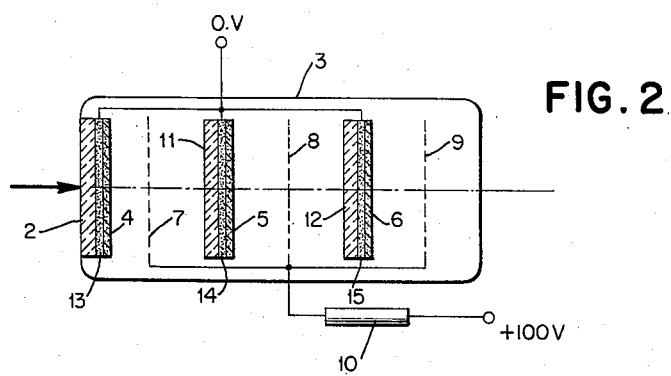
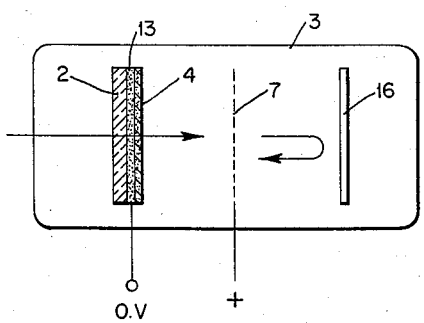
INVENTOR.
WALTER SPRICK
BY
AGENT Dec. 29, 1959 W. SPRICK 2,919,364
PHOTOCELL WITH TRANSPARENT PHOTOCATHODE
Filed Oct. 4, 1955 2 Sheets-Sheet 2
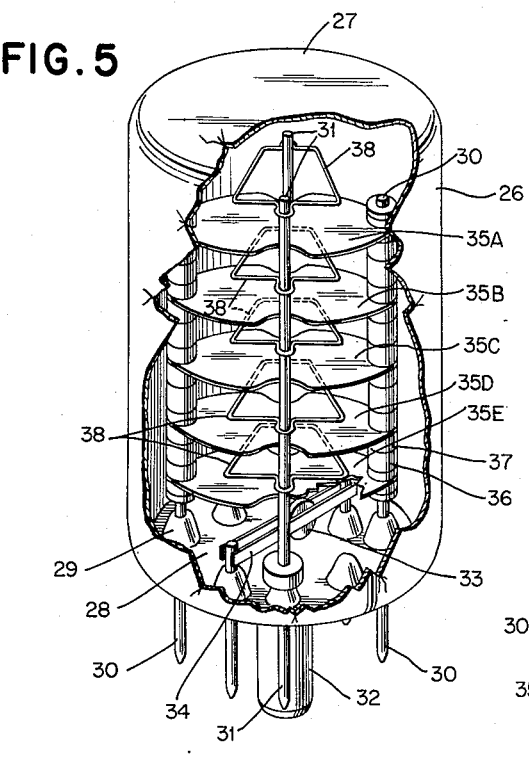
FIG. 5
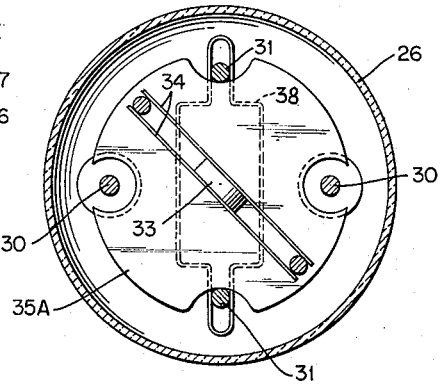
FIG. 6
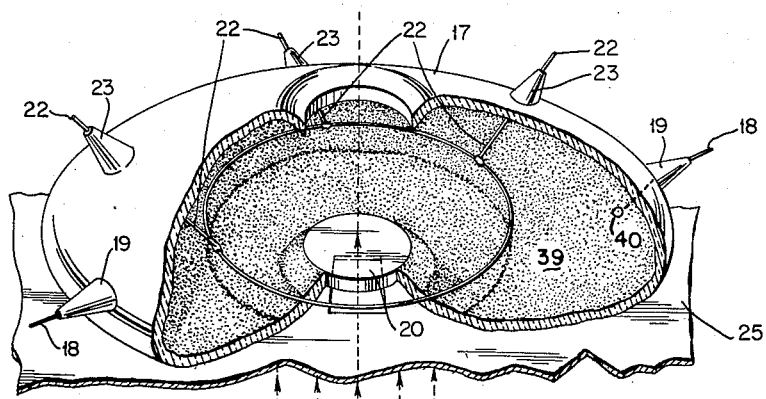
FIG. 4
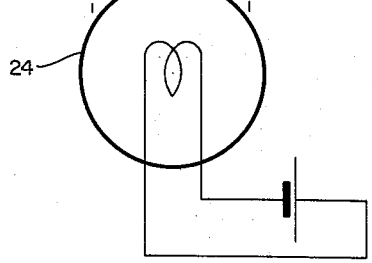
*INVENTOR.*
WALTER SPRICK
BY
AGENT

United States Patent Office 2,919,364
Patented Dec. 29, 1959

2,919,364

PHOTOCELL WITH TRANSPARENT PHOTOCATHODE

Walter Sprick, Boeblingen, Germany, assignor to International Business Machines Corporation, New York, N.Y., a corporation of New York Application October 4, 1955, Serial No. 538,346

3 Claims. (Cl. 313—96)

This invention relates to photoelectric apparatus generally, and more particularly to photoelectric tubes of the type employing transparent photocathodes.

The invention contemplates an improved novel photoelectric cell or tube having transparent photocathodes in which light rays striking the cell pass through one or more photosensitive transparent cathodes.

According to one embodiment of the invetnion a plurality of photocathodes are arranged in series in one and the same ray path within an evacuated envelope.

According to another embodiment of the invention there is disposed at the end of one series of transparent photocathodes a mirror device for reflecting incident light rays back through the transparent photocathodes one or more times for thereby liberating additional electrons collected by one or more electrodes.

According to yet another embodiment of the invention, the use of an integrating sphere or spheroid is contemplated. The inner surface of this sphere is provided with a mirror and, according to the invention, carries thereon a transparent photosensitive layer.

An object of the invention resides in the provision of a novel type of photoelectric tubes having greatly increased electro-optical efficiencies.

A principal object of the invention resides in the provision of transparent photocathodes for use in photoelectric tubes.

Another object of the invention resides in the provision of a novel transparent photocathodic mirror for more efficiently converting light to electrical energy than it has been possible to obtain with prior art devices.

Another feature of the invention resides in the provision of novel means for constructing a light integrating spheroid for disposing in its inner cavity at least one photocathode.

Yet another object of the invention resides in the provision of means embodying the principles above outlined in a commercial high-efficiency photoelectric tube.

Other features of the invention will be pointed out in the following description and claims and illustrated in the accompanying drawings, which disclose, by way of example, the principle of the invention and the best mode, which has been contemplated, of applying that principle.

In the drawings:

Fig. 1 illustrates a method of scanning a record according to the prior art.

Fig. 2 is a schematic drawing of a photoelectric tube employing a number of transparent photocathodes.

Fig. 3 is a schematic drawing of a photoelectric tube employing a transparent photocathode and a mirror.

Fig. 4 is a diagrammatic representation of a spherical cell employing a transparent reflection photocathode.

Fig. 5 is a cutaway view of a production photoelectric cell constructed with transparent photocathodes arranged one behind the other.

Fig. 6 is a top view of the tube of Fig. 5.

It is well known that the intensity of light reflected from an illuminated area according to Lambert's law is proportional to the cosine of the radiation angle. If a light flux A impinges upon an area F (Fig. 1) at a vertical angle through an optical system, for example, such as that shown by a single lens L, and the reflected light therefrom is collected by receivers which may be photocells B and $B^1$, it may be mathematically shown that these cannot receive the maximum of the radiation emitted in surface F. The radiation losses in a system of this sort are quite large, and the system will become impractical if, for example, the light source comprises a flying spot scanner such as is depicted schematically by a cathode ray tube C which, by its nature, has a low total lumen output.

Hence, in scanning an illuminated object such as a codified record according to reflection methods, it is very important that the light receiver collects the greatest possible amount of reflected light. One way to increase the efficiency of the collection is to use large area photocathodes. For example, the figure indicated by K in Fig. 1 might be considered to be a spherical photocathode which is capable of integrating a large proportion of the light which is reflected by the small area $F^1$ on the surface F.

A still more efficient sensing system can be arranged with the entire reflected surface F placed in the center of the spherical cell so that all of the reflected light is integrated by the receiver.

Yet another method disclosed by the prior art of increasing the sensitivity of the light pickup would be to use photoelectric cells having multiplier cathodes. A light integrating arrangement of this latter type can be realized only with some difficulty because for an equal pickup of all released electrons on the multiplier stages, a homogeneous light flux must exist between the photocathode and the first multiplier stage.

A novel, more efficient, photoelectric cell for so integrating electric light will be described. Such a photocell comprises a plurality of photocathodes so positioned within an evacuated envelope that the incident light and reflected light flux is caused to traverse each photocathode more than once. The preferred method of accomplishing such a traverse is to use a photocathode which is transparent by nature.

The measure of success of any transparent photocathode lies in the amount of light absorption incurred by a light ray traversing the same. Generally, the thinner the photolayer is the smaller will be the absorption by layer per ray passage. The use of very thin photosensitive layers permit a large number of these to be traversed by a light path such that all of the light flux in the said beam becomes effectively absorbed within the cell. Under such conditions the following principles will prevail.

If $k$ designates the absorption factor in such a manner that the emergent light energy equals $k$L, where L represents the entering light energy, and if $s_1$ designates the number of electrons released at a first layer, and if $s_2$ designates the number of electrons released at a second layer, etc., the total number of emitted electrons released from a multiplicity of photosensitive layers can be shown to be:

$$S = s_1(1 + k + k^2 + \ldots + k^{n-1})$$

assuming that the electron emission will always occur on only one of the sides of a transparent photosensitive layer. For the total number S we may find a critical value of:

$$S_n \to \infty = s_1 \left(\frac{1}{1-k}\right)$$

With an absorption of ninety-five percent of the light energy incident upon such a system the critical value will tend to equal $20s_1$, and with a light absorption of ninety-nine percent it will equal $100s_1$.

Thus it will be appreciated that it is of great advantage if the light ray penetrates the layers frequently and is substantially absorbed.

Fig. 2 shows a photocell provided with a plurality of transparent photocathodes disposed along the axis of a light beam designated 1. The photocell comprises an evacuated envelope 3 having at the incident light end a window 2, on one side of which is placed a transparent photocathode 4. On the axis of the incident light beam a plurality of glass carrier pieces 11 and 12 are placed. On one side of each glass 11 and 12 is deposited a photocathode 5 and 6, and a transparent metal electrode 13, 14 and 15. On the axis of the light beam 1 and following each photocathode are disposed collector electrodes 7, 8 and 9. These electrodes are electrically joined and supplied with a positive potential through a resistor 10 from a source of potential, not shown. The transparent metal electrodes 13, 14 and 15 are electrically connected to the negative pole of the potenial source.

A modification of the device of Fig. 2 is shown in Fig. 3.

Within an evacuated envelope there is placed a transparent photocathode 4 and its companion transparent metal electrode 13, both deposited upon a carrier 2 [equivalent to window 2 (Fig. 2)], a collector electrode 7 and a mirror 16.

The function of the mirror 16 is, of course, to return the non-absorbed light flux so that a second passage of the transparent photocathode is effected.

In the construction of the transparent photocathodes upon their carriers, provision is made by well known optical techniques concerning the art of depositing materials upon a carrier by evaporation in a vacuum to provide each photocathode-electrode-carrier unit with a determined spectral transmission band. By so having one photocathode unit responsive to light, for example, in each of the blue, green and red portions of the light spectrum, the efficiency of converting a maximum of light flux to electrical energy is realized.

In constructing the sensitive surface and the mirror, the element which is to act as the mirror surface is evaporated on to the carrier. Depending upon the ultimate spectral result desired and the desired efficiency of the surface, the invention contemplates that either silver, gold, copper or platinum films may be used. Following the depositing of the mirror surface film the photosensitive material is deposited on top of the film by the same evaporation techniques. Again, depending upon the spectral result desired, single light transmissive films of either antimony or cesium may be deposited. Again for varying the spectral response it is contemplated that a pair of light permeable layers may be provided by evaporating a first layer of antimony and on top thereof a second layer of cesium.

The invention also contemplates, as disclosed in the modification of Fig. 4, the use of an integrating sphere. The actual photocell takes the form of an oblate spheroid 17. The inner surface of the spheroid is provided with a mirror 39 and upon this mirror there is deposited the aforementioned transparent photocathode and metallic electrode. A connection 40 is made to the metallic electrode by means of wires 18 entering the spheroid through stems 19. A window adapted to admit light to the spheroid's interior is shown at 20. The electron collector electrode takes the form of a wire circle 21 suspended by wires 22 passing through stems 23 to the outside.

Interposed between the source of light 24 and the window 20 is a portion of a perforated record 25 of the well known IBM card type.

As has been heretofore explained, light flux entering a closed vessel is substantially absorbed within the vessel. The well known integrating sphere is an example of a device adapted to absorb light flux in its entirety.

In this novel modification of a photocell, the entering light flux is caused to be re-reflected countless times by the mirror surface under the transparent photocathode traversing the cathode each time to cause the same to liberate electrons.

Figs. 5 and 6 disclose the construction of a photocell employing transparent photocathodes which is designed to be made in quantity production.

A glass tube 26 has welded to one end a window 27 and to the other end a stem press 28. Press 28 is provided with a number of wire carrying stems 29. Certain of the wires 30, 31 are adapted to pass through stems 29 to the outside, serving as socket engaging terminals. A nipple 32 is provided in the center of the press for attaching the tube to an evacuating means.

A gettering material pill 33 of cesium chromate and zirconium is held between a pair of strips of tantalum. After evacuation of the envelope has been effected, a current is passed through the gettering pill and the tantalum strips so that the cesium will be gradually evaporated, absorbing the remaining gas existent within the envelope.

Wires 30 are adapted to hold the photocathode carriers 35A and 35E in axial relationship. These carriers are mounted on wires 30 and held separated by a system of ceramic washers 36 and 37.

Ceramic washers 36 are first copper plated by a hot-dip operation on all surfaces before being assembled on wires 30, while ceramic washers 37 have their opposite ends surface-ground and copper plated by being hot-dipped. The cylindrical surfaces of washers 37 are enameled prior to the hot-dip plating operation.

The photocathode carriers 35A and 35E are ground and polished glass discs having a thickness of from 0.2 to 0.3 millimeter. Both surfaces of these discs are provided with photocathodes, with the exception of disc 35E which is the bottom one above the stem press 28.

The photocathodes may be of the type comprising the elements of antimony-silver and cesium. An alloy of antimony and silver is applied to each disc by evaporation under vacuum. A heavy coating of silver is applied to the bottom of disc 35E to form a mirror for reflecting light rays back through the photocathodes, as described in connection with Fig. 3.

Similarly, the inside wall of tube 26, forming part of the envelope, may be silvered, and this may be effected by painting with a heavy silver paste.

The edge of each disc is heavily silvered by painting the same with silver paste.

In assembly upon wires 30, the discs are threaded on the wires in the following order: disc 35E with the silver mirror coating on the bottom, a pair of washers 36, a pair of washers 37, disc 35D, a pair of washers 37, a pair of washers 36, etc., and the entire stack being placed under compression so that a conductive connection will exist between the topmost and bottommost washers. When such connection is obtained, wires 30 are crimped to render the assembly in permanent form.

The collector electrodes or anodes 38 are supported on wires 31 being held in position by being welded to the supporting wires.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A photoelectric device comprising a plurality of transparent photoemissive cathode discs positioned in spaced relationship transverse to a common axis along which an activating light beam is to pass, a separate wire anode positioned in spaced relationship between each adjacent pair of said cathode discs, each of said anodes defining an opening at said axis for passage of said activating light beam and each of said anodes being positioned in transverse relationship to said axis, a common electrical connection to all of said anodes, each of said cathode discs having transparent photoemissive cathodes formed on both sides thereof, different ones of said photoemissive cathodes being responsive to different portions of the light spectrum, a common electrical connection to all of said cathodes, said device being enclosed within an evacuated envelope having a transparent window aligned with said axis for admission of activating light.

2. A photoelectric device comprising a plurality of transparent photoemissive cathode discs positioned in spaced relationship transverse to a common axis along which an activating light beam is to pass, a separate wire anode positioned in spaced relationship between each adjacent pair of said cathode discs, each of said anodes defining an opening at said axis for passage of said activating light beam and each of said anodes being positioned in transverse relationship to said axis, a common electrical connection to all of said anodes, each of said cathode discs having transparent photoemissive cathodes formed on both sides thereof, different ones of said photoemissive cathodes being responsive to different portions of the light spectrum, a common electrical connection to all of said cathodes, said device being enclosed within an evacuated envelope having a transparent window aligned with said axis for admission of activating light, and a mirror positioned within said envelope transversely at the end of said axis opposite said window for reflecting activating light which passes through all of said cathodes back to said cathodes.

3. A photoelectric device comprising a plurality of transparent photoemissive cathode discs positioned in spaced relationship transverse to a common axis along which an activating light beam is to pass, a separate wire anode positioned in spaced relationship between each adjacent pair of said cathode discs, each of said anodes defining an opening at said axis for passage of said activating light beam and each of said anodes being positioned in transverse relationship to said axis, a common electrical connection to all of said anodes, each of said cathode discs having transparent photoemissive cathodes formed on both sides thereof, different ones of said photoemissive cathodes being responsive to different portions of the light spectrum, a common electrical connection to all of said cathodes, said device being enclosed within an evacuated envelope having a transparent window aligned with said axis for admission of activating light, a mirror positioned within said envelope transversely at the end of said axis opposite said window for reflecting activating light which passes through all of said cathodes back to said cathodes, and the walls of said envelope exclusive of the axial end portions being coated with light reflective material.

References Cited in the file of this patent

UNITED STATES PATENTS

| | | |
|---|---|---|
| 1,969,558 | Ives | Aug. 7, 1934 |
| 2,034,586 | Long | Mar. 17, 1936 |
| 2,054,884 | Schlesinger | Sept. 22, 1936 |
| 2,083,995 | Henroteau | June 15, 1937 |
| 2,107,782 | Farnsworth et al. | Feb. 8, 1938 |
| 2,112,975 | Penning et al. | Apr. 5, 1938 |
| 2,218,340 | Maurer | Oct. 15, 1940 |
| 2,444,915 | Code | July 13, 1948 |
| 2,538,588 | Pakswer et al. | Jan. 16, 1951 |
| 2,739,084 | Sommer | Mar. 20, 1956 |
| 2,742,550 | Jenness | Apr. 17, 1956 |

FOREIGN PATENTS

| | | |
|---|---|---|
| 910,570 | Germany | Mar. 5, 1954 |